June 15, 1926.
H. W. HEM
PIVOT RETAINER
Filed August 20, 1921
1,588,455
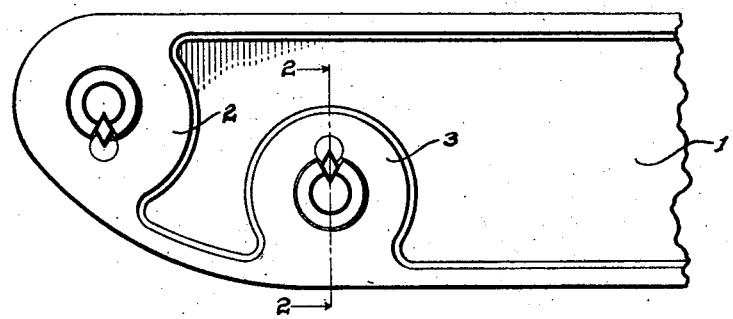
Fig. I.
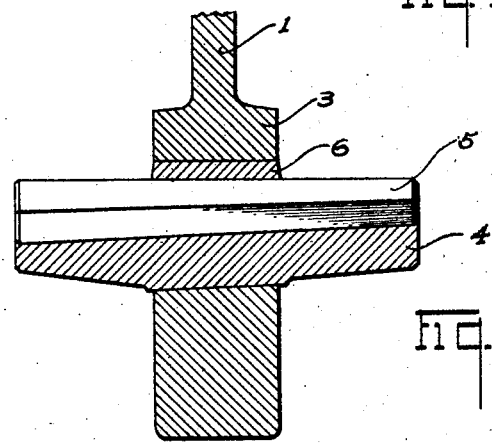
Fig. II.
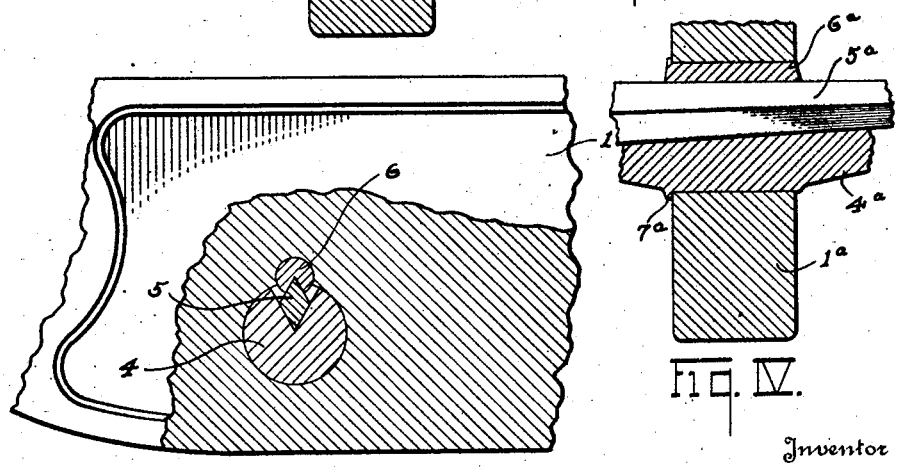
Fig. III.
Fig. IV.
Inventor
HALVOR W. HEM.
By       Marshall
Attorney Patented June 15, 1926.

1,588,455

UNITED STATES PATENT OFFICE.

HALVOR W. HEM, OF TOLEDO, OHIO, ASSIGNOR TO TOLEDO SCALE COMPANY, OF TOLEDO, OHIO, A CORPORATION OF NEW JERSEY.

PIVOT RETAINER.

Application filed August 20, 1921. Serial No. 493,876.

This invention relates to means for mounting knife edge pivots such as are used in weighing scales and analogous machines. and, while I have shown the device as used for the purpose of securing a pivot to a scale lever, it is also adapted for securing pivots to other parts of machines.

My invention has for one of its objects the provision of inexpensive and efficient means for securely holding a pivot bar in place on a lever or other part.

Another object of the invention is to provide means for so mounting a pivot that it is reliably held against accidental shifting, but nevertheless is readily removable for purposes of repair and replacement.

Still another object is the provision of an inexpensive and efficient combined thrust bearing and retaining key.

Other objects and advantages will be apparent from the following description, in which reference is had to the accompanying drawings illustrating preferred embodiments of my invention and wherein similar reference numerals designate similar parts throughout the several views.

In the drawings:—

Figure I is a fragmentary elevational view, showing the end of a lever with two pivots secured thereto, according to my invention;

Figure II is an enlarged fragmentary sectional elevational view taken substantially on the line 2—2 of Figure I;

Figure III is an enlarged fragmentary elevation, showing parts of a lever and my pivot retaining device in section; and Figure IV is an enlarged fragmentary sectional view similar to Figure II, showing a modification.

Referring to the drawings in detail, the lever 1 is of a type used in scales designed for weighing comparatively heavy loads, and has a vertical web with laterally extending flanges along its upper and lower sides, making it of substantially I-beam section. The portions of the web through which the pivots extend are formed with integral bosses 2 and 3, which are preferably of about the depth of the flanges and are merged with them, as shown in Figure I.

In the form of the device shown in Figure II a tapered hole is drilled through the boss with the axis of the hole perpendicular to the central vertical plane of the lever. A cylindrical hole is then bored through the lever perpendicular to its central vertical plane, so that it intersects the upper side of the tapered hole.

Inserted in the tapered hole through the lever is a pivot retainer 4, the central portion of which is tapered to fit the hole so the retainer may be driven tightly into place, the end portions of the retainer being reduced, as indicated in Figure II.

Milled or otherwise formed in one side of the retainer is a V-shaped groove which is progressively deepened from one end of the retainer to the other, and received within the groove is a tapered pivot bar 5 of hardened steel. The bar 5 is of parallelogrammatic cross section, the acuteness of the angle of its knife edge being suited to the duty that the pivot is intended to perform. It is tapered from end to end, the degree of taper being such that when it lies in the groove of the pivot retainer with its larger end in the deeper end of the groove its upper edge is perpendicular to the central vertical plane of the lever.

Inserted in the cylindrical hole which extends through the lever is a hardened steel pin 6 having a V-shaped groove which receives the upper edge of the pivot bar 5, as shown in Figure III. The ends of the pin 6 are of conical shape, the apexes of the cones lying substantially on the knife edge of the pivot bar 5.

The pin 6, therefore, serves as a key to prevent the knife edge from shifting and also as an anti-friction thrust member, which co-operates with the bearing that engages the knife edge pivot.

In assembling the device, the pin 6 is first driven into place. The pivot and retainer are then loosely inserted and finally driven tightly into place.

In the modification shown in Figure IV, both of the intersecting holes in the lever 1$^a$ are cylindrical. The central portion of the pivot retainer 4$^a$ is also cylindrical and fits within the larger hole, and the retainer is provided with a shoulder or stop flange 7$^a$ to limit the distance that it may be driven into the lever.

The groove which receives the lower side of the pivot bar 5$^a$ is tapered, as in the modification shown in Figure II, and the pivot bar 5ª and the pin 6ª are in all respects similar to the pivot bar 5 and pin 6 already described.

In assembling the form of device shown in Figure IV the pivot retainer 4ª and the pin 6ª are first driven into place and the tapered pivot bar 5ª is then driven into the opening formed by the grooves. The parts are thus wedged tightly into place. This construction is somewhat less expensive than that first described, since the pivot retainer 4ª, the pin 6ª and the holes in the lever are all cylindrical and the holes are parallel to each other and perpendicular to the central vertical plane of the lever.

In both of the modifications shown the pivot bar acts as a wedge, and while the parts are securely held against accidental movement the pivot bar may easily be driven out, should it become worn or damaged. By simply inverting the bar a new edge is provided.

While it will be apparent that the illustrated embodiments of my invention herein disclosed are well calculated to adequately fulfill the objects primarily stated, it is to be understood that the invention is susceptible to variation, modification and change within the spirit and scope of the subjoined claims.

Having described my invention, I claim:

1. In a device of the class described, in combination, a lever having round intersecting openings therein, grooved members received in said openings, and a pivot bar fitted into the grooves of said members.

2. In a device of the class described, in combination, a lever having round intersecting openings therein, grooved members received in said openings, and a tapered pivot bar wedged between said members and having portions received in said grooves.

3. In a device of the class described, in combination, a lever having round intersecting openings, a grooved pivot retainer in one of said openings, a knife edge pivot bar partially received in the groove of said retainer, and a grooved pin in the other of said openings, the knife edge of said pivot bar being received in the groove of said pin, said pin being adapted for anti-frictional engagement with the bearing.

4. In a device of the class described, in combination, a lever having round intersecting openings, a grooved pivot retainer in one of said openings a knife edge pivot bar partially received in the groove of said retainer, and a grooved pin in the other of said openings, the knife edge of said pivot bar being received in the groove of said pin, the end of said pin being crowned with its highest point lying substantially on the knife edge of said pivot.

5. In a device of the class described, in combination, a lever having a pair of intersecting openings, grooved members in said openings, the grooves of said members facing each other, the groove of one of said members being sloped, and a tapered pivot bar wedgingly engaging said groove.

6. In a device of the class described, in combination, a lever having a pair of intersecting openings, grooved members in said openings, the grooves of said members facing each other, the groove of one of said members being sloped and the groove of the other of said members being non-sloping, and a tapered pivot bar wedgingly engaging said grooves.

7. In a device of the class described, in combination, a lever having a pair of intersecting cylindrical openings, a pair of members fitting said openings, said members having grooves opening toward each other, and a pivot bar wedgingly engaging said members and having portions received in said grooves.

8. In a device of the class described, in combination, a lever having a pair of intersecting cylindrical openings, a pair of members fitting said openings, said members having V-shaped grooves opening toward each other, and a pivot bar wedgingly engaging said members and having a portion received in said V-shaped grooves.

9. In a device of the class described, in combination, a lever having a pair of intersecting cylindrical openings, a pair of members fitting said openings, one of said members having a positioning shoulder, each of said members having a groove opening toward the groove of the other member, and a pivot bar wedgingly engaging said members and having portions received in said grooves.

HALVOR W. HEM.